US007035711B2

(12) United States Patent
Watanabe et al.

(10) Patent No.: US 7,035,711 B2
(45) Date of Patent: Apr. 25, 2006

(54) MACHINING SYSTEM

(75) Inventors: Atsushi Watanabe, Tokyo (JP); Kazuhisa Otsuka, Yamanashi (JP); Masaru Oda, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 38 days.

(21) Appl. No.: 10/627,689

(22) Filed: Jul. 28, 2003

(65) Prior Publication Data

US 2004/0039484 A1 Feb. 26, 2004

(30) Foreign Application Priority Data

Aug. 23, 2002 (JP) .............................. 2002-243544

(51) Int. Cl.
*G06F 19/00* (2006.01)
(52) U.S. Cl. ........................................ 700/180; 700/87
(58) Field of Classification Search .................. 700/17, 700/19, 20, 86, 87, 169, 179, 180
See application file for complete search history.

(56) References Cited

U.S. PATENT DOCUMENTS

| | | | |
|---|---|---|---|
| 4,543,639 A | | 9/1985 | Inaba et al. .................. 700/249 |
| 4,894,908 A | * | 1/1990 | Haba et al. .................... 29/711 |
| 5,050,088 A | | 9/1991 | Buckler et al. ............... 700/96 |
| 5,653,005 A | | 8/1997 | Speller, Sr. et al. .......... 29/701 |
| 5,740,616 A | * | 4/1998 | Seddon et al. ................ 33/554 |
| 5,883,803 A | * | 3/1999 | Vann ........................... 700/59 |
| 5,896,292 A | * | 4/1999 | Hosaka et al. ............... 700/108 |
| 5,969,973 A | * | 10/1999 | Bourne et al. ............... 700/165 |

(Continued)

FOREIGN PATENT DOCUMENTS

| | | |
|---|---|---|
| EP | 0 355 454 A2 | 2/1990 |
| JP | 05-228866 | 9/1993 |
| JP | 06-149329 | 5/1994 |
| JP | 09-10848 | 1/1997 |
| JP | 10-97313 | 4/1998 |
| JP | 2000-222015 | 8/2000 |
| JP | 3079973 | 6/2001 |

OTHER PUBLICATIONS

Eurpoean Search Report dated Feb. 23, 2004 for corresponding EP application 03254998.

(Continued)

*Primary Examiner*—Maria N. Von Buhr
(74) *Attorney, Agent, or Firm*—Staas & Halsey LLP

(57) ABSTRACT

A machining system displaying operation programs and associated information for a plurality of components of the system on the same display screen for confirming, creating and editing of the operation programs and associated information. A machine tool, a jig device for fixing/unfixing a workpiece on the machine tool, a handling robot and a visual sensor are connected with an information processing device by a communication path. A list of items specifying operation programs and associated information for the respective components is displayed with respect to different kinds of workpieces on a display screen of the information processing device. When one or more of the items are selected by an operator, the operation program or programs and the associated information specified by the selected item or items are displayed in the form of a window on the display screen.

7 Claims, 4 Drawing Sheets

U.S. PATENT DOCUMENTS

| | | | |
|---|---|---|---|
| 6,292,716 B1 * | 9/2001 | Moore et al. | 700/260 |
| 6,349,237 B1 * | 2/2002 | Koren et al. | 700/96 |
| 6,463,360 B1 * | 10/2002 | Terada et al. | 700/257 |
| 6,507,767 B1 * | 1/2003 | Bourne et al. | 700/165 |
| 6,556,891 B1 * | 4/2003 | Hietmann et al. | 700/245 |
| 6,571,148 B1 * | 5/2003 | Wunder | 700/175 |
| 6,735,494 B1 * | 5/2004 | Wunder | 700/175 |

OTHER PUBLICATIONS

A. Costa, et al. "Design of a Control System for a Flexible Manufacturing Cell", Journal of Manufacturing Systems, vol. 4, No. 1, 1985, pp. 65-84.

Office Action issued by Japanese Patent Office on Dec. 21, 2004.

* cited by examiner

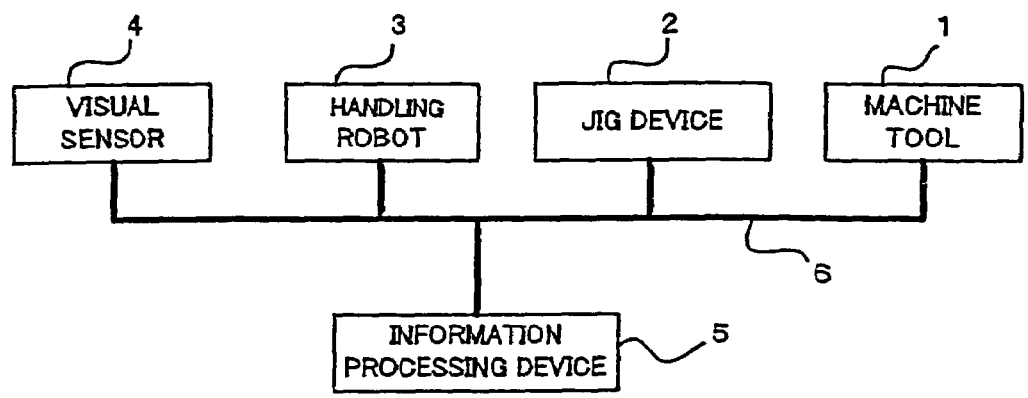

MACHINING SYSTEM

BACKGROUND OF THE INVENTION

1. Field of the Invention

The present invention relates to a machining system in which workpieces are automatically supplied to a machine tool and automatically machined by the machine tool.

2. Description of Related Art

A machining system for automatically and successively supplying and machining workpieces is constituted by components of a visual sensor for detecting position/orientation of a supplied workpiece, a jig device for fixing/unfixing the workpiece, a handling robot for holding the supplied workpiece using the detected position/orientation of the workpiece and transferring the workpiece to a position of the jig device and also for taking out a machined workpiece from the jig device, and a machine tool for machining the workpiece fixed by the jig device, etc.

The workpiece are successively supplied from an automatic storehouse to a predetermined supply place where position/orientation of the supplied workpiece is detected by the visual sensor. The handling robot holds the workpiece at position/orientation determined by correcting a taught position/orientation using the detected position/orientation of the workpiece and transfers the held workpiece to the position of the jig device. The workpiece fixedly mounted thereon by the jig device is machined by the machine tool according to a machining program. After completing the machining, the machined workpiece is unfixed from the machine tool, and is taken from the jig device by the handling robot and transferred for the next process, to thus perform the supplying, machining and transferring of workpieces automatically and successively.

In the above-described machining system, the visual sensor, the robot, the jig device and the machine tool cooperate with one another to perform the series of operations. Therefore, the operation programs and associated information therewith such as set values of various parameters for respective controllers of the visual sensor, the robot, the jig device and the machine tool have influence with one another. Thus, it is necessary to take conformity with these operation programs and the associated information for the components of the system so as to continuously perform the series of operations.

Conventionally, the operation programs and the associated information such as machining or operation conditions set by parameter values are displayed on display devices provided at the respective controllers of the components of the system for confirmation and adjustment of the operations thereof.

However, since the operation programs and the associated information for the respective components of the system are displayed separately on the display devices of the respective components of the system, an operator has to move to places of the respective display devices or operators distributed to the places of the respective display devices have to communicate with one another in order to confirm and adjust the operations of the components of the system, to lower efficiency of the confirmation and adjustment of the operation programs and the associated information for the components of the system.

Different operations of the components of the system are required for different kinds of workpieces and therefore different operation programs and associated information have to be prepared for the machining of different kinds of workpieces. Thus, it is necessary for an operator to refer a table indicating the programs and the associated information for the respective components for each kind of workpiece in confirmation and adjustment of the operation programs and the associated information for the respective components of the system.

SUMMARY OF THE INVENTION

The present invention provides a machining system capable of allowing an operator to confirm and edit the operation programs and the associated information for respective components of the system with ease.

A machining system for machining workpieces of different kinds of the present invention comprises: a machine tool for performing machining on a workpiece; a handing robot for handing the workpiece; a visual sensor for detecting the workpiece; an information processing device connected with the machine tool, the handling robot and the visual sensor through a communication path. The information processing device includes display means for displaying a list of items specifying operation programs for the machine tool, the handling robot or the visual sensor to be used for different kinds of workpieces on a display screen; and communicating means for uploading/downloading an operation program specified by one of the items displayed on the display screen selected by an operator and/or information associated with the operation program from/to the machine tool, the handling robot and the visual sensor, wherein the operation program and/or the associated information specified by the item selected by the operator are displayed on the display screen to allow the operator to confirm and edit the displayed operation program and/or associated information.

The information processing device may further include editing means for editing the operation program and/or the associated information displayed on the display screen. The associated information may include parameters for executing the operation program.

The display means may simultaneously display information on a plurality of operation programs specified by items selected by the operator on the display screen.

The display means may simultaneously display the operation programs and/or the associated information for at least two of the machine tool, the handling robot and the visual sensor on the display screen.

One of the machine tool, the handling robot and the visual sensor may function as the information processing device.

BRIEF DESCRIPTION OF THE DRAWINGS

FIG. 1 is a block diagram of a machining system according to an embodiment of the present invention;

FIG. 2 is a diagram showing an example of a list of items displayed on a display screen of an information processing device;

DETAILED DESCRIPTION OF PREFERRED EMBODIMENTS

Figure 3:
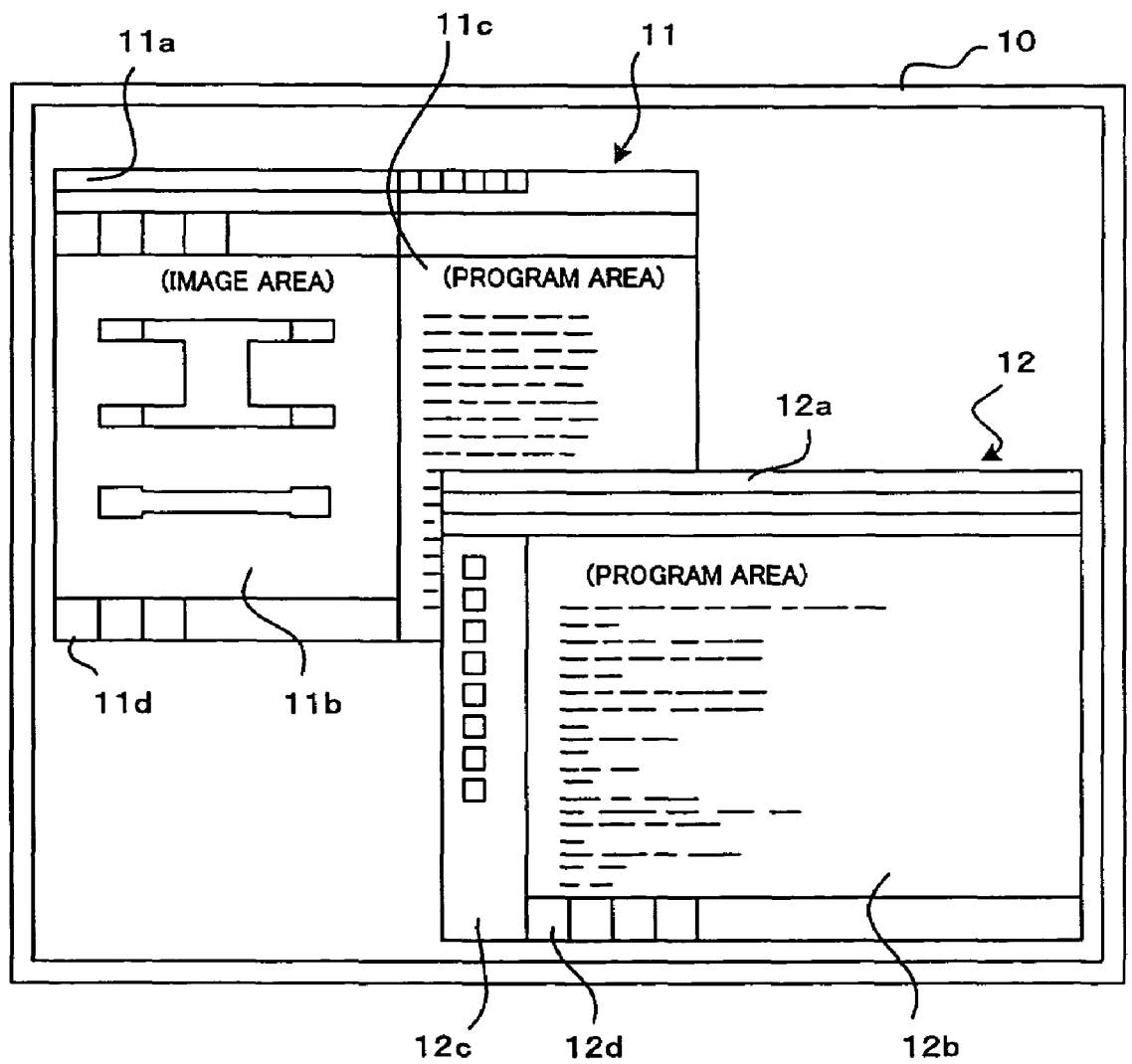
FIG. 3 is a diagram showing an example of information on selected two items displayed on the display screen.

FIG. 1 shows a machining system according to an embodiment of the present invention. A machining system of this embodiment is constituted by components of a machine tool 1, a jig device 2 for fixing and unfixing a workpiece to the machine tool 1, a handling robot 3, a visual sensor 4, an information processing device 5 and a communication path 6 for communication between the information processing device 5 and the machine tool 1, the jig device 2, the handling robot 3 and the visual sensor 4. The machine tool 1, the jig device 2, the handling robot 3 and the visual sensor are provided with respective controllers having communication interfaces in addition to the hardware configuration of the conventional controllers. The jig device 2 may be controlled by the controller of the machine tool 1. The information processing device 5 has a hardware configuration comprising a processor, a communication interface, a storage device, a display device, a data input device such as a keyboard, a mouse and a touch panel.

In this machining system, workpieces are successively supplied from an automatic storehouse to a predetermined supply place and an image of the workpiece supplied to the supply place is captured by the visual sensor 4 and the captured image is analyzed to obtain position/orientation of the workpiece. A displacement between a predetermined reference position/orientation and the detected position/orientation is obtained and sent to the controller of the handling robot 3. The controller of the robot 3 corrects a taught position/orientation for holding a workpiece based on the displacement of the workpiece and moves a robot hand to the corrected position/orientation to hold the workpiece and transfers the held workpiece to a place of the jig device 2. The workpiece held by the robot hand is fixed on the machine tool 1 by the jig device 2, and the robot hand is opened after confirming that the workpiece is fixed by the jig device 2 and returns to a home position. The machine tool 1 performs machining on the workpiece fixed by the jig device 2. When the machining is completed, the robot 3 holds the machined workpiece and transfers the machined workpiece to the next process after the workpiece is unfixed from the machine tool 1 by the jig device 2.

As described, a series of operations are automatically performed by the machining system. For the above operations, machining programs for machining workpieces and associated information such as machining conditions set by parameters are stored in the controller of the machine tool 1. Different machining programs and the associated information are required for different kinds of workpieces and different kinds of machining. Therefore, it is necessary to store different machining programs and associated information therewith for different kinds of workpieces to be machined in the controller of the machine tool 1.

Similarly, different operation programs for operating the jig device 2 to fix/unfix a workpiece on the machine tool 1 are required for different kinds of workpieces and it is necessary to select one of the different operation programs suitable for the kind of workpiece to be machined. The operation programs and images of sample workpieces and parameter values for the visual sensor 4 to detect position/orientation of the workpiece and obtain a displacement of the detected workpiece from the reference position/orientation have to be stored for each kind of the workpieces. With respect to the handling robot 3, the positions/orientations of the robot hand for holding a workpiece and transferring the held workpiece to the jig device, and a motion path of transferring of the workpiece are different in dependence on the kind of workpiece, and thus it is necessary to store the operation programs and the associated information such as parameters of operation conditions for respective kinds of workpieces.

These operation programs and the associated information such as parameter values for the respective components 1–4 of the system are correlated with one another to be grouped by kind of workpiece to be machined into sets of operation programs and associated information for respective kinds of workpieces.

The operation programs and the associated information to be used for respective kinds of workpieces are stored in the respective controllers of the machine tool 1, the jig device 2, the handling robot 3 and the visual sensor 4, and the operation programs and the associated information suitable for the kind of workpieces to be machined are selected for the respective controllers. In the information processing device 5, items of names or ID numbers, each specifying an operation program and associated information for each of the components of the system, are stored for each kind of workpiece to be machined.

Figure 4:
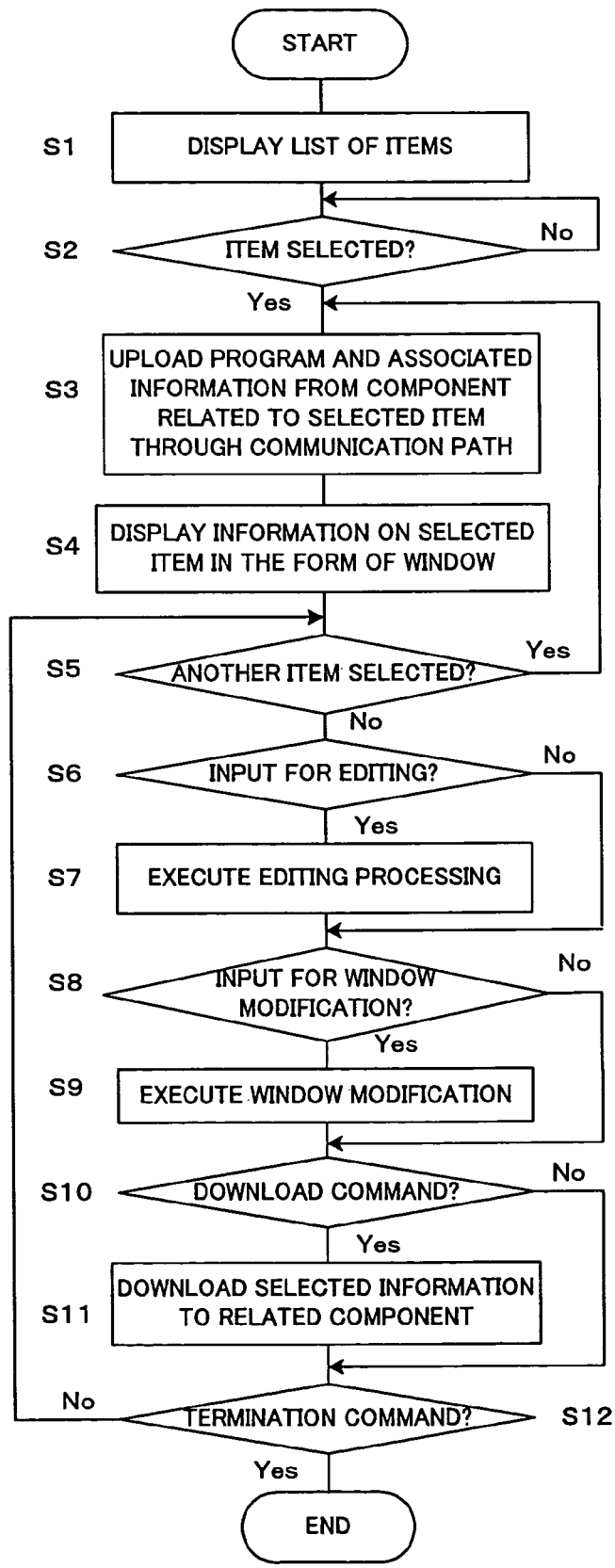
FIG. 4 is a flowchart of processing to be executed by a processor of the information processing device.

The processor of the information processing device 5 starts the processing as shown in FIG. 4 when a command for displaying a list of items is inputted.

First, the names or ID numbers specifying operation programs and associated information for the respective components of the system suitable for each kind of workpiece are read and displayed on the display device of the information processing device 5 as a list of items grouped by kind of workpiece and by component of the system, as shown in FIG. 2 (Step S1). When an operator selects one of the items in the list through the data input device (Step S2), the operation programs and associated information such as parameters are uploaded from the controllers of the components of the system related to the selected item to the information processing device 5 through the communication path 6 and the uploaded data are displayed on a display screen 10 of the display device in the form of a window (Steps S3, S4).

For instance, when the item "W001", as shown with hatching in FIG. 2, for the visual sensor designated for the kind of workpiece "K1" is selected, data of the operation program to be executed by the controller of the visual sensor 4 for the workpiece of the kind K1 and the associated information for the operation program are displayed on the display screen in a window 11, as shown in FIG. 3. In FIG. 3, the window 11 includes a program name indication area 11a at left above, an image display area 11b at left center, an operation program display area 11c at right center and buttons 11d for selecting data of parameters. When the displayed program is in execution, a pointer indicating a position of the program in execution is displayed to indicate a progress of execution of the program.

The processor repeatedly determines whether or not there is another item selected (Step S5), any manual input for editing (Step S6), any manual input for window modification (Step S8), an download command inputted (Step S10), and a termination command inputted (Step S12). When another item in the list is selected (Step S5), the procedure returns to Step S3 and the processing of Steps S3 and S4 is executed to display the information regarding the selected item. For example, the item "PNS001" for the handling robot with respect to a kind of workpice "K1" as indicated by fine dots in FIG. 2, a window 12 having a program name indicating area 12a indicating "PNS0001" and a program display area 12b displaying the contents of the operation program is displayed on the display screen. In this case also, when the program is in execution, a state of progress of the program is indicated by a cursor. The window 12 is also provided with an area 12c providing buttons for selecting the other kinds of workpieces and an area 12c providing buttons for selecting data of parameters to be displayed.

Similarly, the item "RIGHT" for the jig device 2 or the item "LX20" for the machine tool 1 with respect to the workpiece of the kind "K1" is selected, the operation program and associated information for the controller for the jig device or the machining program and associated information for the controller of the machine tool 1 are displayed on the display screen in the form of window. In the displayed window, if one of the buttons 11d, 12d for selecting associated information is selected by the operator, the parameters of the associated information are displayed.

Thus, the operation programs and the associated information such as parameters for the machine tool 1, the jig device 2, the handling robot 3 and the visual sensor 4 for use in machining of the workpiece of the kind "K1" are displayed on the same display screen simultaneously.

Further, in the case where there is a problem in the operation programs and the associated parameters or a shape or material of the workpiece is modified, it is necessary to modify the operation programs and/or the associated parameters. When it is determined that manual operation of the data input device for editing the operation programs and the associated parameters is inputted by an operator (Step S6), the processor executes processing for the editing (Step S7).

Further, when it is determined that manual operation on the data input device for modifying the window on the display screen such as enlargement, contraction and movement (Step S8), the processor performed processing for the required modification (Step S9).

After the editing of the operation programs and/or the associated parameters is finished, when a command for download the edited operation program and/or the associated parameters is inputted (Step S10), the edited operation program and/or the associated parameters are downloaded to the controller of the associated component of the system through the communication path 6 (Step S11). For example, as shown in FIG. 2, in the case where the item "PNS0001" for the handling robot is selected and the operation program specified by the item "PNS0001" is displayed, when a download command for the "PNS0001" is inputted, the displayed operation program is downloaded to the controller of the handling robot 3 and stored therein to be rewritten.

If it is determined that a termination command is inputted (Step S12), the procedure is terminated.

As described, editing of the operation programs and the associated information such as parameters is carried out by the information processing device 5 and the edited operation programs and the associated information are downloaded to the respective apparatuses 1–4 to update the operation programs and the associated information stored in the respective components, to make the management of the machining process easy.

In the foregoing embodiment, the operation programs and the associated information are stored in the respective components 1–4 of the system. Alternatively, the operation programs and the associated information for the respective components of the system with respect to the kinds of workpieces may be stored in the information processing device 5, so that the operation programs and the associated information specified by a selected item are downloaded to the respective components of the system.

Figure 5:
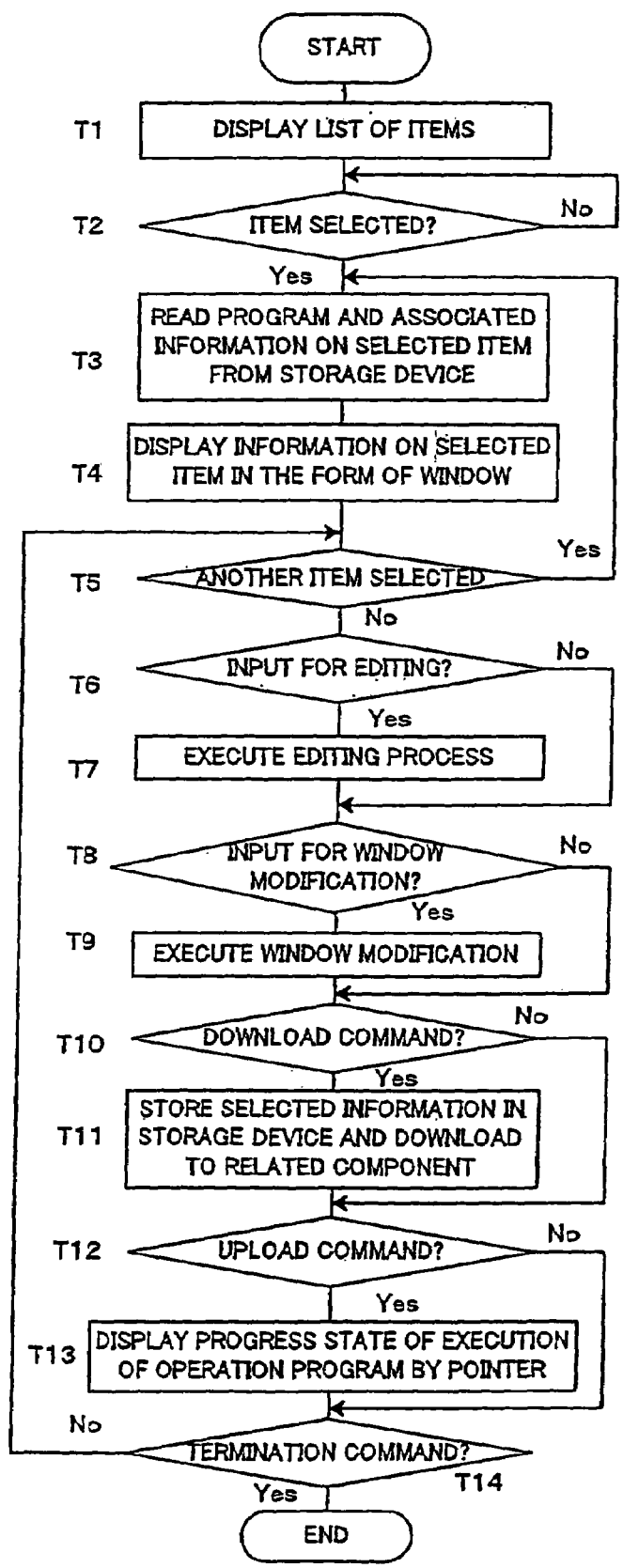
FIG. 5 is a flowchart of another processing to be executed by a processor of the information processing device.

FIG. 5 shows processing for the information management in the case where the operation programs and the associated information for the respective components of the system are stored in the information processing device. This processing differs from the processing shown in FIG. 4 in Steps T3, T11–T13.

A command for display a list of items, a list of operation programs for the respective components of the system with respect to the kinds of workpieces is displayed on the display screen 10 of the information processing device 5, as shown in FIG. 2 (Step T1). When it is determined that any of the items in the list is selected by an operator through the data input device (Step T2), the operation program and the associated information such as parameters for the selected item are read from the storage device in the information processing device 5 and displayed on the display screen 10 of the display device in the form of window (Steps T3, T4). This processing is different from that in the processing shown in FIG. 4 in that the program and the associated information are read from the storage device of the information processing device 5.

When the item "W001" for the visual sensor with respect to the kind of workpiece "K1" is selected, a window including the operation program and an image of a sample workpiece of the kind "K1" as the associated information for the visual sensor 4 suitable for the machining of the workpiece of the kind "K1" is displayed. The name of the operation program is indicated in a name indication area 11a, the image of the sample workpiece is displayed in the image display area 11b, contents of the operation program is displayed in a program display area 11c, and the associated information selection buttons are displayed in the area 11d.

The processor repeatedly determines whether or not there is another item selected (Step T5), any manual input for editing (Step T6), any manual input for window modification (Step T8), an download command inputted (Step T10), an upload command inputted (Step T12), and a termination command inputted (Step S12). If it is determined that another item is selected from the list (Step T5), the procedure returns to Step T3 to perform the processing of Steps T3 and T4 to display the information on the selected item. For example, when an item "PNS0001" for the handling robot with respect to the work of the kind "K1" is selected, a window 12 having the program name area 12a indicating the name of the program, the program display area 12b displaying the robot operation program, the area 12c displaying the buttons for selecting other kinds of workpieces, and the area 12d displaying buttons for selecting the associated information is displayed on the display screen 10, as shown in FIG. 3.

Similarly, the item "RIGHT" for the jig device 2 or the item "LX20" for the machine tool 1 with respect to the workpiece of the kind "K1" is selected, the operation program and associated information for the controller for a jig device or the machining program and associated information for the controller of the machine tool 1 are displayed on the display screen in the form of window. In the displayed window, if one of the buttons 11d, 12d for selecting associated information is selected by the operator, the parameters of the associated information are displayed.

Thus, the operation programs and the associated information such as parameters for the machine tool 1, the jig device 2, the handling robot 3 and the visual sensor 4 for use in machining of the workpiece of the kind "K1" are displayed on the same display screen simultaneously.

Further, in the case where there is a problem in the operation programs and the associated parameters or a shape or material of the workpiece is modified, it is necessary to modify the operation programs and/or the associated parameters. When it is determined that manual operation of the data input device for editing the operation programs and the associated parameters is inputted by an operator (Step T6), the processor executes processing for the editing (Step T7).

Further, when it is determined that manual operation on the data input device for modifying the window on the display screen such as enlargement, contraction and movement (Step T8), the processor performed processing for the required modification (Step T9).

After the editing of the operation programs and/or the associated parameters is finished, when a command for download the edited operation program and/or the associated parameters is inputted (Step T10), the edited operation program and/or the associated parameters are downloaded to the controller of the related component of the system through the communication path 6, and also stored in the storage device of the information processing device 5 to be rewritten and updated (Step T11).

Furthermore, when one of the kinds of workpieces is selected and a command for download is inputted (Step T10), the operation programs and the associated information for the respective components with respect to the selected kind of workpiece are read from the storage device and downloaded to the respective components of the system. The processing shown in FIG. 5 differs from the processing shown in FIG. 4 in that the operation programs and the associated information are downloaded to the respective components of the system at a time, and that the operation programs and the associated information are stored in the storage device of the information processing device 5 to be rewritten to update the original operation programs and the associated information, as well as downloaded to the respective components of the system.

When one of the components of the machine tool, the jig device, the handling robot and the visual sensor is selected in the list as shown in FIG. 2 and an upload command is inputted (Step T12), the operation program and the associated information in execution for the selected component are uploaded and displayed on the display screen 10 in the form of a window and the progress status of execution of the operation program is indicated by a pointer (Step T13).

When it is determined that a termination command is inputted (Step T12), the procedure is terminated.

With the above procedure as shown in FIG. 5, the operation programs and the associated information for the respective components of the machining system can be confirmed and edited using only the information processing device 5, and a group of the operation programs and the associated information for the respective components with respect to each kind of workpiece are displayed on the same display screen 10 simultaneously for confirmation and editing thereof. Further, when the operation programs are in execution, progress statuses of execution of the operation programs are displayed to be monitored.

In the foregoing description, the information processing device 5 is provided separately from the controllers of the visual sensor 4, the handling robot 3, the jig device 2 and the machine tool 1. However, one of the controllers of the visual sensor 4, the handling robot, the jig device 2 and the machine tool 1 may be used to perform the function of the information processing device 5.

In the foregoing description, the items of names or ID numbers specifying the operation programs and the associated information for the respective components of the system are displayed as a list. The names or ID numbers of the operation programs and the names or ID numbers of the associated information may be separately displayed on the display screen.

According to the present invention, the operation programs and the associated information for the respective components of the machining system, which cooperate with one another, can be confirmed, created and edited at one place by an operator, to improve efficiency of management of the machining system. The operation programs and the associated information for the components of the system are simultaneously displayed on the same display screen to allow the operator to confirm relations among the components and present status of the operations of the respective components of the system.

What is claimed is:

1. A machining system for machining workpieces of different kinds, comprising:
    a machine tool for performing machining on a workpiece;
    a handling robot for handing the workpiece;
    a visual sensor for detecting the workpiece;
    an information processing device connected with said machine tool, said handling robot and said visual sensor through a communication path,
    said information processing device including display means for displaying a list of items specifying operation programs for said machine tool, said handling robot or said visual sensor to be used for different kinds of workpieces on a display screen; and
    communicating means for uploading/downloading an operation program specified by one of the items displayed on the display screen selected by an operator and/or information associated with the operation program between the information processing device and said machine tool, said handling robot or said visual sensor,
    wherein the operation program and/or the associated information specified by the item selected by the operator are displayed on the display screen, the operator confirming and editing the displayed operation program and/or associated information according to the displayed information.

2. A machining system according to claim 1, wherein said information processing device further includes editing means for editing the operation program and/or the associated information displayed on the display screen.

3. A machining system according to claim 1, wherein said associated information includes parameters for executing the operation program.

4. A machining system according to claim 1, wherein said display means simultaneously displays information on a plurality of operation programs specified by items selected by the operator on the display screen.

5. A machining system according to claim 1, wherein said display means simultaneously displays the operation programs and/or the associated information for at least two of said machine tool, said handling robot and said visual sensor on the display screen.

6. A machining system according to claim 1, wherein one of said machine tool, said handling robot and said visual sensor functions as said information processing device.

7. An apparatus, comprising:
    a sensor to detect an orientation of a workpiece;
    a machine tool to machine the workpiece;
    a handling robot to hold the workpiece;
    an information processing device in communication with said machine tool, said handling robot and said sensor, said information processing device including a display screen to display a list of items specifying operation programs for said machine tool, said handling robot or said sensor to be used for different kinds of the workpieces; and a communicating unit to upload/download the operation program specified by one of the items displayed on the display screen selected by an operator and/or information associated with the operation program, wherein the operation program and/or the associated information specified by the item selected by the operator are displayed on the display screen, the operator confirming and editing the displayed operation program and/or associated information according to the displayed information.

* * * * *